United States Patent Office 3,478,206
Patented Nov. 11, 1969

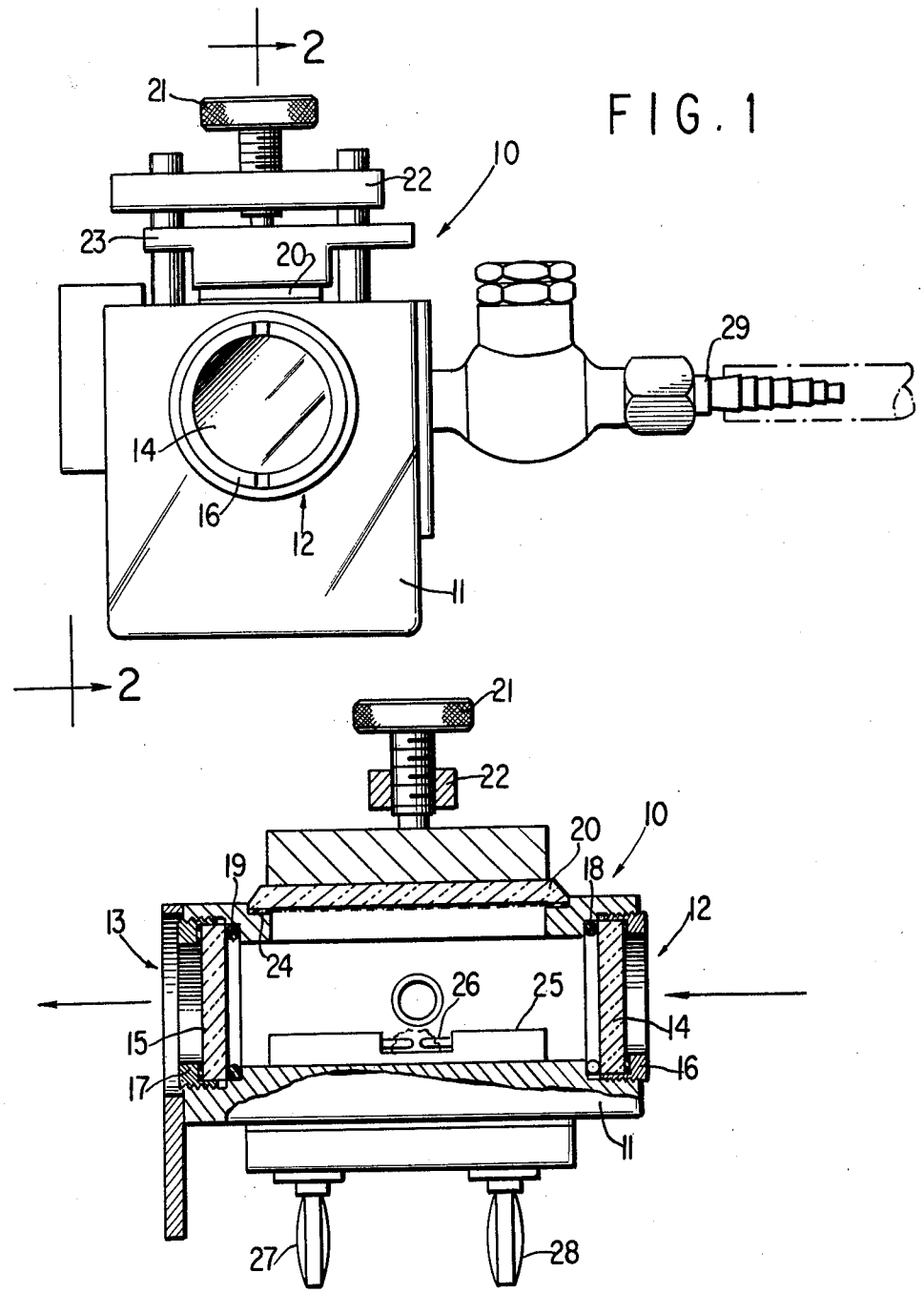

3,478,206
MULTIPURPOSE SAMPLE CELL FOR CONVENTIONAL AND ATTENUATED TOTAL REFLECTION ABSORPTION SPECTROSCOPY OF GASEOUS AND SOLID SAMPLES
John P. Gaglione, Stratford, Conn., assignor to Wilks Scientific Corporation, South Norwalk, Conn., a corporation of Connecticut
Filed Nov. 13, 1967, Ser. No. 682,224
Int. Cl. G01n 23/12
U.S. Cl. 250—43.5                    2 Claims

ABSTRACT OF THE DISCLOSURE

A unitary spectrophotometric sample cell in which a material can be placed in a vapor phase and a solid phase by heating and decomposing the same in said unitary cell, the same cell being placeable in spectrophotometric devices for determining the characteristics of both the vapor phase and solid phase.

---

This invention relates to spectrophotometric sample cells for holding a material for analysis.

In the prior art, various types of cells for holding material have been used. A cell for vapor phase determination has been used and a separate cell for the solid phase determination employed. These have not been convenient and the results have not been entirely satisfactory.

One of the objects of the invention is to provide a single cell arrangement for spectrometric analysis.

In one aspect of the invention, a chamber is used having openings at each end thereof closed by radiant energy passing windows. The cell is particularly useful in conjunction with infrared analysis techniques. The chamber can have a valve means for evacuating the same. Another wall of the chamber has a multiple internal reflection plate thereon, such a plate being well known in the art. Also, the chamber has a filament or heater holder which can be connected to a source of electric energy. The sample is placed adjacent the heater which is then connected to the source of electric energy at the selected electric energy level for the time required to produce the desired decomposition thereof. A vapor phase is created within the chamber and a solid phase is deposited on the inside of the internal reflection plate. The cell then can be placed in a spectrophotometric device passing an infrared or similar beam through the end windows and vapor phase. The small cell also can be placed in a spectrophotometric device in such a manner that the infrared beam is directed onto the end face of the internal reflection plate so that the characteristic of the solid phase material can be determined.

These and other objects, advantages and features of the invention will become apparent from the following description and drawings which are merely exemplary.

In the drawings:

FIG. 1 is an end view of one form of the invention;

FIG. 2 is a longitudinal view partially in section along the line 2—2 of FIG. 1;

Figure 3:
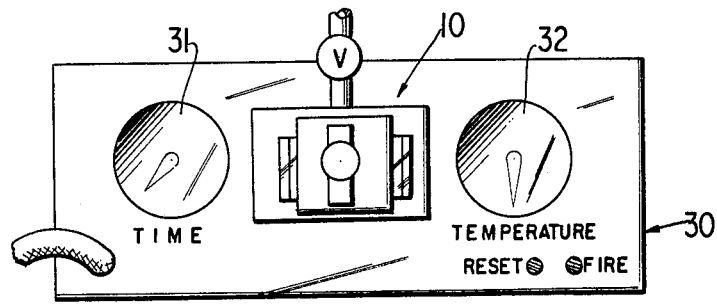
FIG. 3 is a view of a device for firing the sample.

Referring to FIGS. 1 and 2, the cell is generally indicated at 10, said cell having walls 11 with end apertures 12, 13 closed by radiant energy passing windows 14, 15 respectively. The windows 14, 15 may be removably held in place by threaded rings 16, 17 sealed by suitable O-rings 18, 19.

Multiple internal reflection plate 20 is made of a suitable material such as sodium chloride, thallium bromide, iodide and germanium. The plate 20 is removably held in place by screw 21 in yoke 22 which acts on block 23. Sealing means 24 is provided.

The plate 25 can be located in one wall of chamber 10, plate 25 being of a suitable material, such as ceramic, and having a filament 26 thereon. Filament 26 is connected to terminals 27, 28.

An evacuating connection 29 can be connected to a wall of the chamber.

In operation, the plate 20 or plate 25 can be removed and the material to be determined placed on or adjacent the filament or heater element 26. The chamber is closed and a source of vacuum connected to 29. The cell is placed on the electric energy source 30 (FIG. 3) and the energy applied thereto for the time desired. The source 30 can have meters 31, 32 as needed to indicate time, temperature, etc.

Figure 4:
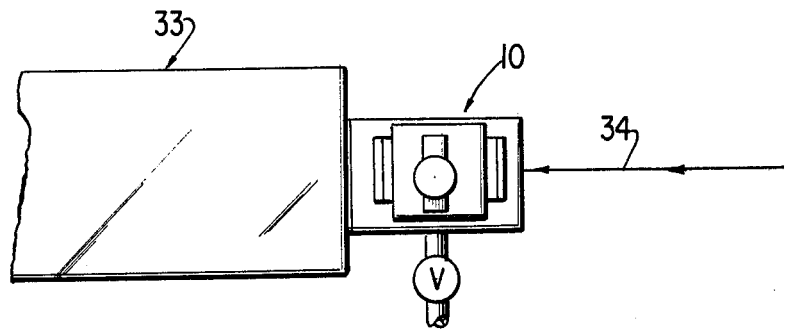
FIG. 4 is a schematic representation of the cell in conjunction with vapor phase determination.

Upon completion of the firing, the cell 10 is placed on the spectrophotometer 33 (FIG. 4) and the infrared or radiant energy beam indicated at 34 directed through the end windows to produce a determination of the vapor phase.

Figure 5:
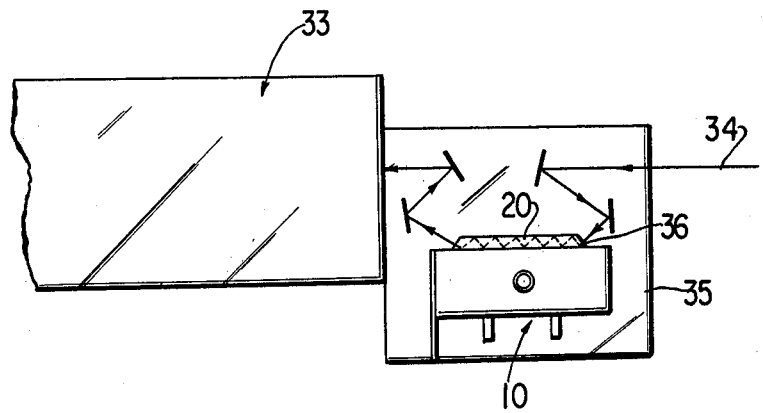
FIG. 5 is similar to FIG. 4 except the solid phase determination is being made.

The same cell 10 then can be placed in a holder 35 which is held in place on spectrophotometer 33 (FIG. 5) in such a manner that the radiant energy beam 34 will be directed against the end 36 of the multiple internal reflection plate 20.

Difficult problems can be solved by the use of the device often fundamental to polymer type and structure. As examples, an ethylene-propylene copolymer may not contain sufficient propylene to show up readily under conventional infrared analysis. The reaction products, however, will more likely indicate the presence of propylene in the vapor phase. In another case, a certain class of cross-linked thermosets uses ammonia gas during the course of polymerization. Although trapped residual $NH_3$ is undetected by conventional IR methods, the vapor phase pyrolysis products using the present cell at 1000° C. clearly indicate its presence.

It should be apparent that details of construction and use can be changed without departing from the spirit of the invention except as defined in the appended claims.

What is claimed is:

1. In a radiant energy multipurpose sample cell, the combination including a chamber having walls and having apertures at the end walls thereof, radiant energy transmitting means closing said apertures, means connected to one of the side walls for evacuating said chamber, a multiple internal reflection plate positioned on an opening in another wall of said chamber, block means on said plate, and means for removably clamping said block against and for holding said plate against said opening, and plate means in said chamber in opposed relation to said reflection plate and having a filament thereon connectable to a source of electric energy for heating and decomposing a sample in said chamber into a vapor phase and into a solid phase deposited on said internal reflection plate, whereby said cell can be placed in a spectrophotometric device passing a beam through said vapor phase and can be placed in a spectrophotometric device directing radiant energy onto the ends of said multiple internal reflection plate to determine the characteristics of said solid phase.

2. A radiant energy sample cell as defined in claim 1 wherein said clamping means includes yoke and screw means for removably clamping said block against said reflection plate.

References Cited

UNITED STATES PATENTS 2,338,234  1/1944  Dimmick.
2,547,545  4/1951  Strong.

OTHER REFERENCES

Paul Wilks, Jr., "Attenuated Total Reflection—a New Infrared Sampling Technique," CIC Newsletter, No. 14, September 1961.

R. Kagel et al., "High Temperature Vacuum Cell for Infrared Studies of Absorbed Molecules," Applied Spectroscopy, vol. 21, No. 3, May/June, 1967.

RALPH G. NILSON, Primary Examiner

C. E. CHURCH, Assistant Examiner

U.S. Cl. X.R.

356—38, 74, 246